US008708861B2

(12) United States Patent
Inagaki et al.

(10) Patent No.: US 8,708,861 B2
(45) Date of Patent: Apr. 29, 2014

(54) ELECTRIC POWER TOOL

(75) Inventors: Kenichirou Inagaki, Hirakata (JP); Yutaka Yamada, Osaka (JP); Tadashi Arimura, Kyoto (JP); Masatoshi Atsumi, Hirakata (JP); Hiroyuki Kaizo, Neyagawa (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/067,708

(22) Filed: Jun. 22, 2011

(65) Prior Publication Data

US 2012/0010043 A1    Jan. 12, 2012

(30) Foreign Application Priority Data

Jul. 6, 2010 (JP) .................................. 2010-154128
Feb. 22, 2011 (JP) .................................. 2011-035373

(51) Int. Cl.
*F16H 3/66* (2006.01)
(52) U.S. Cl.
USPC ............ 475/286; 475/299; 475/275; 173/178; 173/216
(58) Field of Classification Search
USPC .......... 475/286, 323, 327, 326, 330, 299, 298, 475/263, 275, 317, 290; 173/178, 216, 217, 173/47, 48
See application file for complete search history.

(56) References Cited

U.S. PATENT DOCUMENTS

| | | | |
|---|---|---|---|
| 3,134,275 A * | 5/1964 | Davison ........................ | 475/323 |
| 5,897,454 A * | 4/1999 | Cannaliato .................... | 475/265 |
| 2008/0032848 A1 * | 2/2008 | Ho .................................. | 475/299 |
| 2009/0071673 A1 * | 3/2009 | Zhong et al. ................... | 173/216 |
| 2009/0098971 A1 * | 4/2009 | Ho et al. ........................ | 475/153 |
| 2009/0160371 A1 * | 6/2009 | Inagaki et al. .................. | 318/12 |

FOREIGN PATENT DOCUMENTS

| | | |
|---|---|---|
| CN | 1504953 A | 6/2004 |
| CN | 101468464 A | 7/2009 |
| CN | 101637906 A | 2/2010 |
| CN | 101749370 A | 6/2010 |
| JP | 2004-019915 A | 1/2004 |
| JP | 2009-056590 | 3/2009 |
| JP | 2009-078349 | 4/2009 |

OTHER PUBLICATIONS

Office Action dated Jul. 12, 2013 issued in corresponding Chinese application No. 201110189606.0, and English translation thereof.

* cited by examiner

*Primary Examiner* — David D Le
*Assistant Examiner* — Steven B Christ
(74) *Attorney, Agent, or Firm* — Bacon & Thomas, PLLC

(57) ABSTRACT

An electric power tool includes a motor; a speed reducer for transferring a rotational power of the motor at a reduced speed; and a reduction ratio changing unit for changing a reduction ratio of the speed reducer. The speed reduction mechanism includes an axially slidable changeover member and a gear member, the changeover member being engaged with or disengaged from the gear member depending on an axial slide position thereof. The reduction ratio changing unit includes a shift actuator for axially sliding the changeover member, a driving state detector for detecting a driving state of the motor, a slide position detector for detecting a slide position of the changeover member and a controller for driving the shift actuator and for temporarily decreasing or increasing a rotational power of the motor depending on detection results of the driving state detector and the slide position detector, respectively.

14 Claims, 13 Drawing Sheets

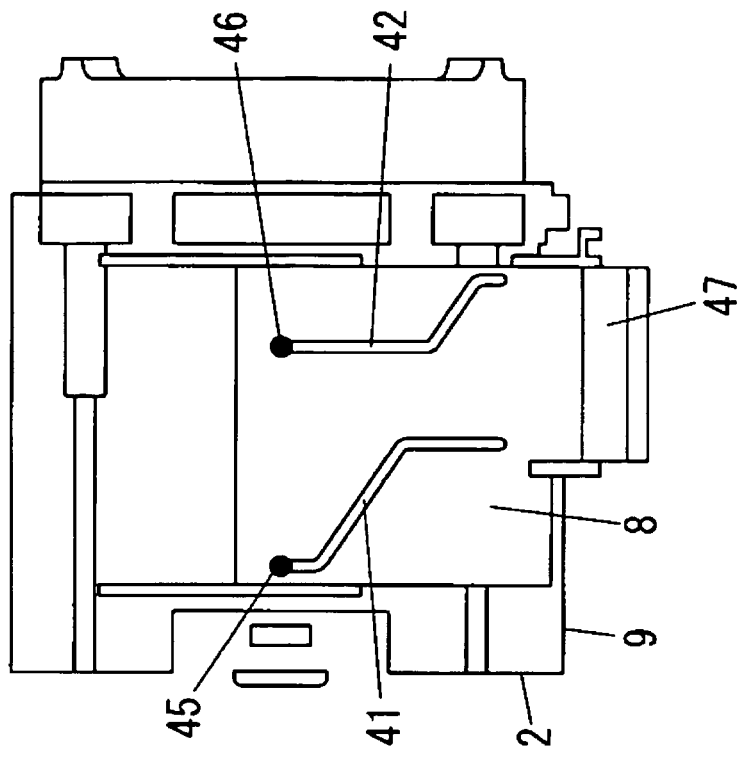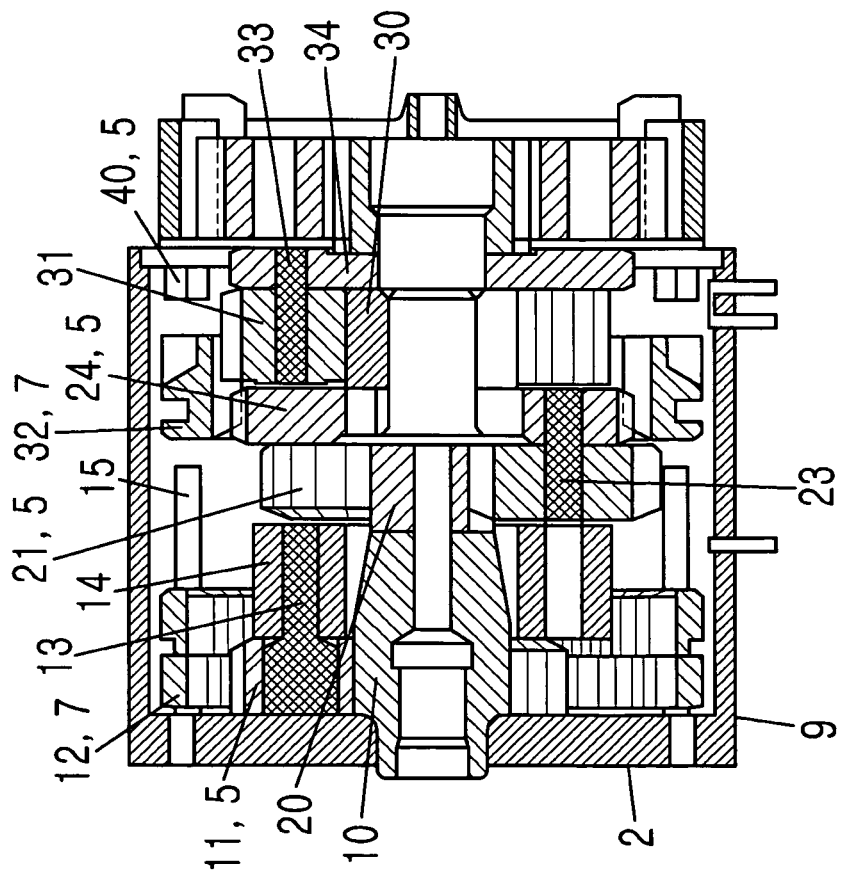

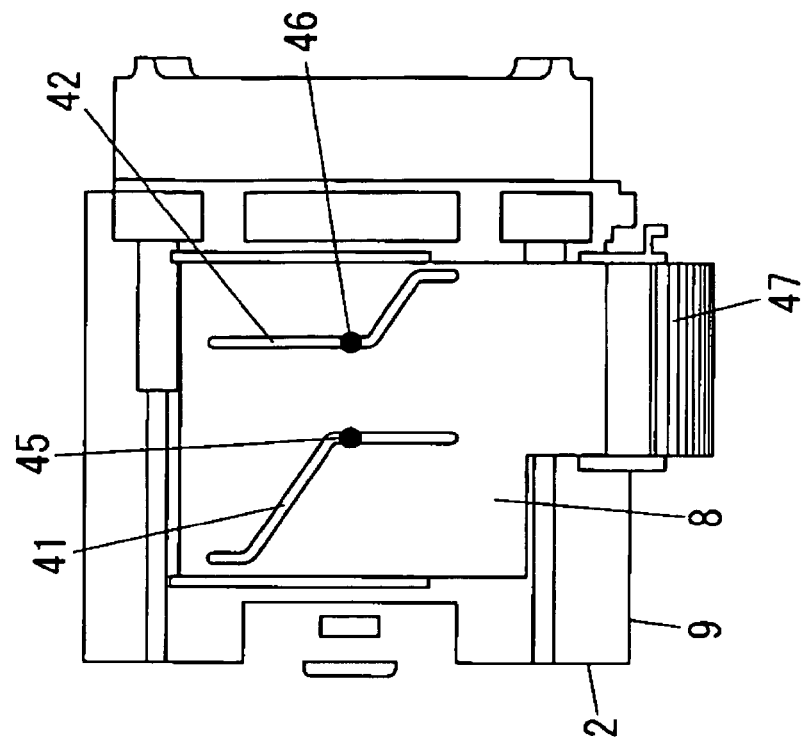
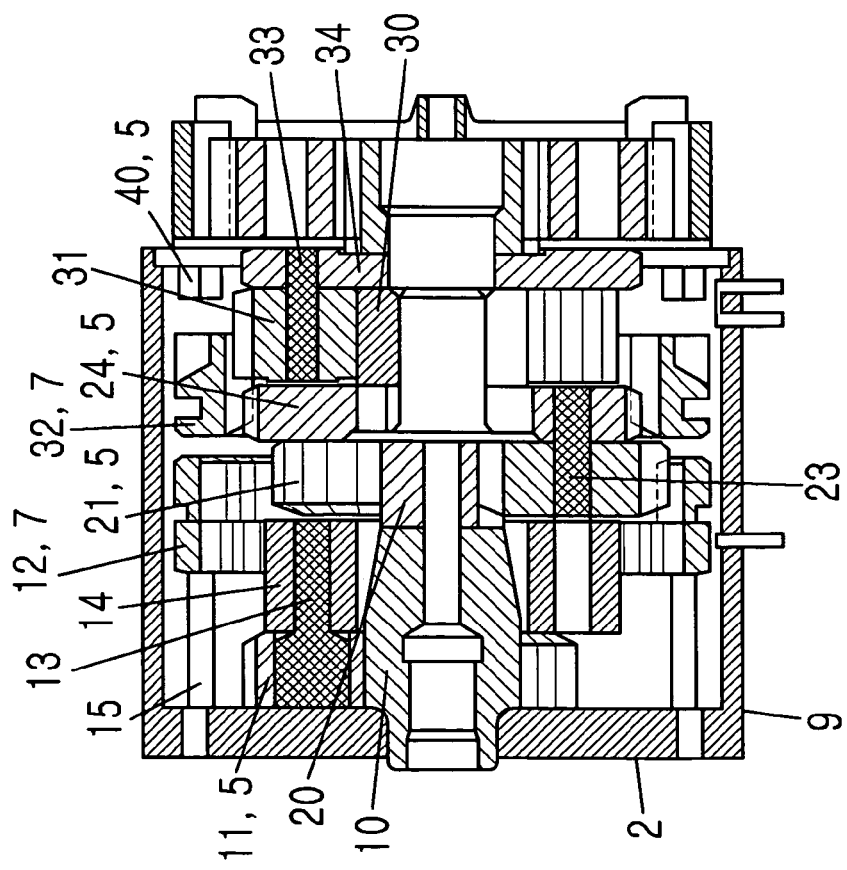
FIG. 8A
FIG. 8B

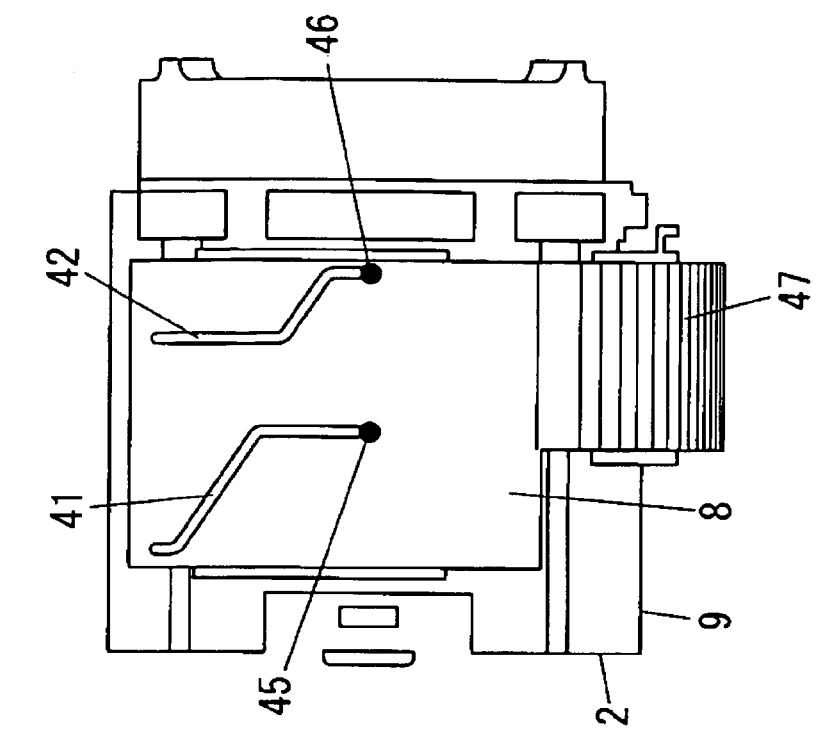
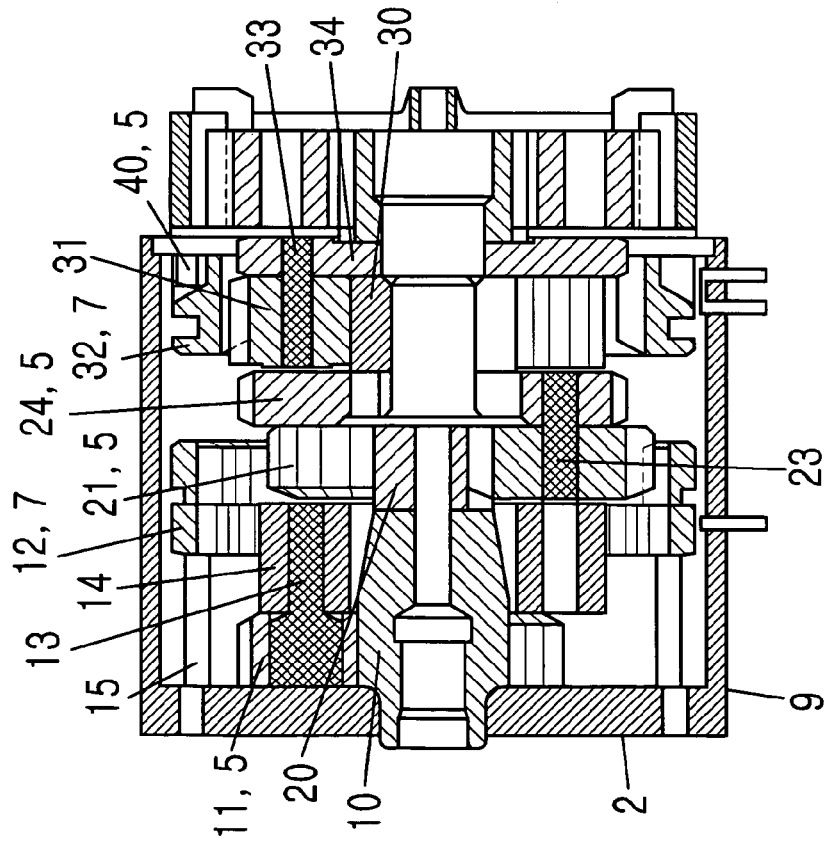
FIG. 10A
FIG. 10B

ELECTRIC POWER TOOL

FIELD OF THE INVENTION

The present invention relates to an electric power tool capable of changing a reduction ratio.

BACKGROUND OF THE INVENTION

In an electric power tool of the type including a speed reduction mechanism, use is made of a structure for changing the reduction ratio of the speed reduction mechanism. In this structure, a changeover member such as a ring gear included in a planetary gear mechanism is axially slid to change the engagement state of the planetary gear mechanism.

For example, Japanese Patent Application Publication Nos. 2009-56590 and 2009-78349 disclose electric power tools in which the slide movement of a changeover member including a ring gear is automatically carried out by a solenoid. In such conventional electric power tools, when the solenoid is operated, the rotation of a motor is stopped or reduced in order to suppress a shock occurring when a changeover member is engaged with a counterpart gear member.

In the conventional electric power tool, when the current of the motor or the like is changed, the solenoid is started up and the rotation of the motor is stopped at a preset timing by a control unit that has detected such change.

However, there is somewhat of a difference between a timing at which the solenoid is started up and the changeover member is actually engaged with the counterpart gear member through a plurality of mechanisms and a timing at which the rotation of the motor is reduced and actually stopped.

For that reason, in the conventional electric power tool mentioned above, there has been employed a method for suppressing the engagement shock to the minimum by reliably performing the stopping of the motor or the like before driving the solenoid. However, it is difficult to complete the change of the reduction ratio in a short time by using the method.

In other words, the conventional electric power tool is not sufficient both to suppress the engagement shock when the reduction ratio is changed and to complete the change of the reduction ratio smoothly in a short time.

SUMMARY OF THE INVENTION

In view of the above, the present invention provides an electric power tool capable of suppressing an engagement shock when a reduction ratio is changed and completing the change of the reduction ratio quickly and smoothly.

In order to accomplish the above object, the electric power tool of the present embodiment has a configuration summarized below.

An electric power tool in accordance with the present invention includes a motor as a drive power source, a speed reduction mechanism for transferring a rotational power of the motor at a reduced speed, and a reduction ratio changing unit for changing a reduction ratio of the speed reduction mechanism.

The speed reduction mechanism includes an axially slidable changeover member and a gear member, the changeover member being engaged with or disengaged from the gear member depending on an axial slide position thereof.

The reduction ratio changing unit includes a shift actuator for axially sliding the changeover member, a driving state detector unit for detecting a driving state of the motor, a slide position detector unit for detecting a slide position of the changeover member and a control unit for starting up the shift actuator depending on a detection result of the driving state detector unit and for temporarily decreasing or increasing a rotational power of the motor depending on a detection result of the slide position detector unit.

The control unit may be designed to change a drive control of the shift actuator depending on the detection result of the slide position detector unit.

The control unit may be designed to temporarily reverse the direction of slide movement of the changeover member caused by the shift actuator if the detection result of the slide position detector unit indicates that the changeover member fails to slide to a desired target position when the shift actuator is driven.

The control unit may be designed to change the sliding drive power of the changeover member applied by the shift actuator if the detection result of the slide position detector unit indicates that the changeover member fails to slide to a desired target position when the shift actuator is driven.

If the detection result of the slide position detector unit indicates that the changeover member fails to slide to a desired target position when the shift actuator is driven, the control unit may be designed to change a relative rotational position between the changeover member, and the gear member while keeping the driving of the shift actuator.

If the detection result of the slide position detector unit indicates that the changeover member fails to slide to a desired target position when the shift actuator is driven, the control unit may be designed to change relative rotational position between the changeover member and the gear member after stopping the driving of the shift actuator.

At this time, the control unit may be designed to change the relative rotational position by increasing the rotational power when it is determined by the detection result of the driving state detector unit that the rotational power of the motor is decreased or stopped.

Further, the control unit may be designed to change the rotational power of the motor such that the rotational acceleration of the rotational power becomes increased in the case that the changeover makes the slide movement compared with the case that the changeover member makes no slide movement.

The slide position detector unit may be designed to detect a position of the changeover member or a member interlocked with the changeover member.

The slide position detector unit may be designed to detect a driving state of the shift actuator and detect a position of the changeover member based on the detection result of the driving state.

At this time, the shift actuator may be of a rotary type, and the slide position detector unit may be designed to detect a rotational state of the shift actuator.

The shift actuator may be a linear actuator, and the slide position detector unit may be designed to detect a linear driving state of the shift actuator.

The present invention offers an advantageous effect in that it is capable of suppressing an engagement shock when a reduction ratio is changed and completing the change of the reduction ratio quickly and smoothly.

BRIEF DESCRIPTION OF THE DRAWINGS

The objects and features of the present invention will become apparent from the following description of embodiments, given in conjunction with the accompanying drawings, in which:

FIG. 6A is a side section view of the speed reduction mechanism kept in a first speed state, and FIG. 6B is a side view thereof;

FIG. 8A is a side section view of the speed reduction mechanism kept in a second speed state, and FIG. 8B is a, side view thereof;

FIG. 10A is a side section view of the speed reduction mechanism kept in a third speed state, and FIG. 10B is a side view thereof;

DETAILED DESCRIPTION OF THE EMBODIMENTS

Embodiments of the present invention will now be described with reference to the accompanying drawings which form a part thereof.

First Embodiment

Figure 1:
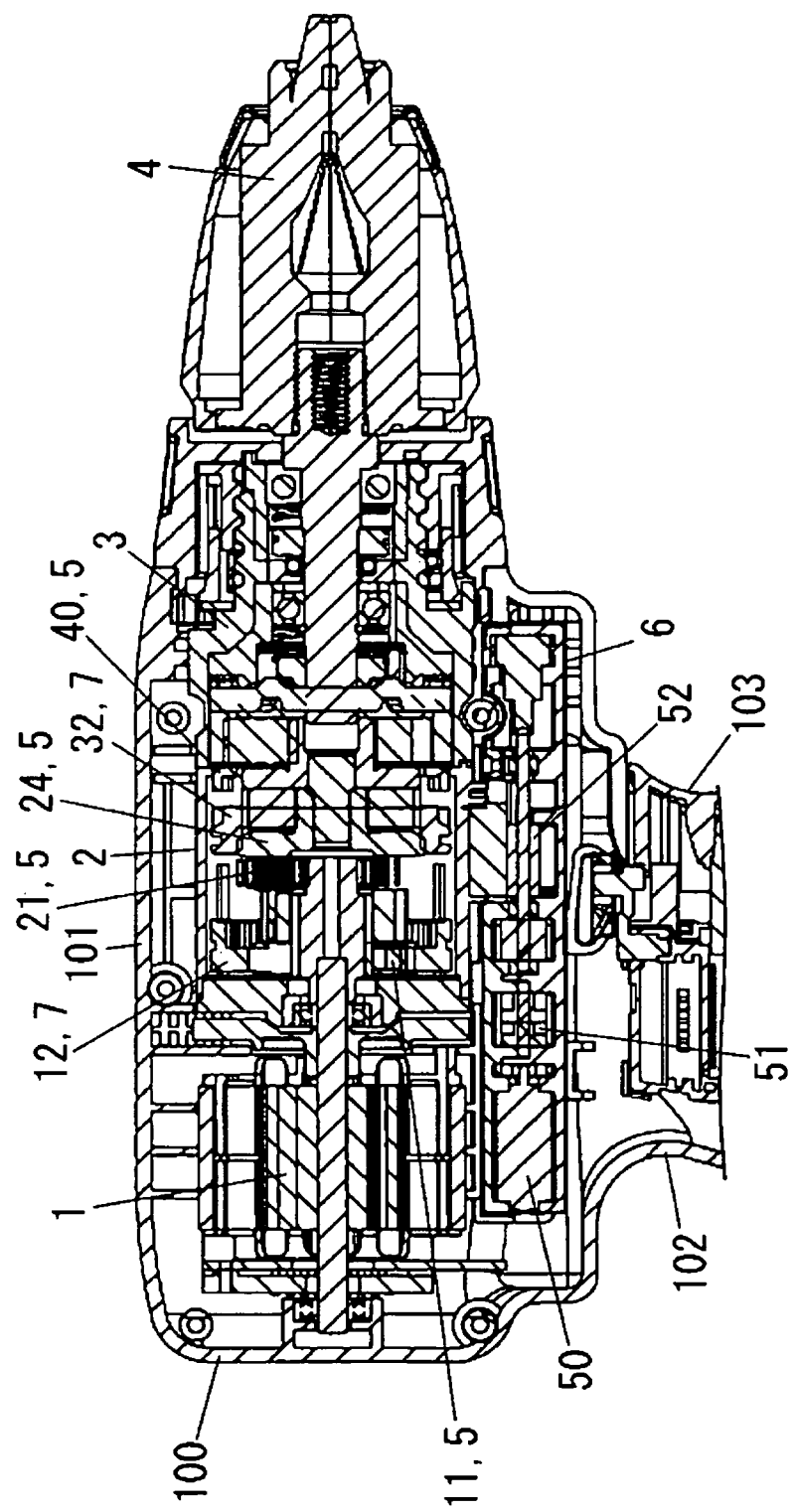
FIG. 1 is a side section view showing an electric power tool in accordance with a first embodiment of the present invention.
Figure 2:
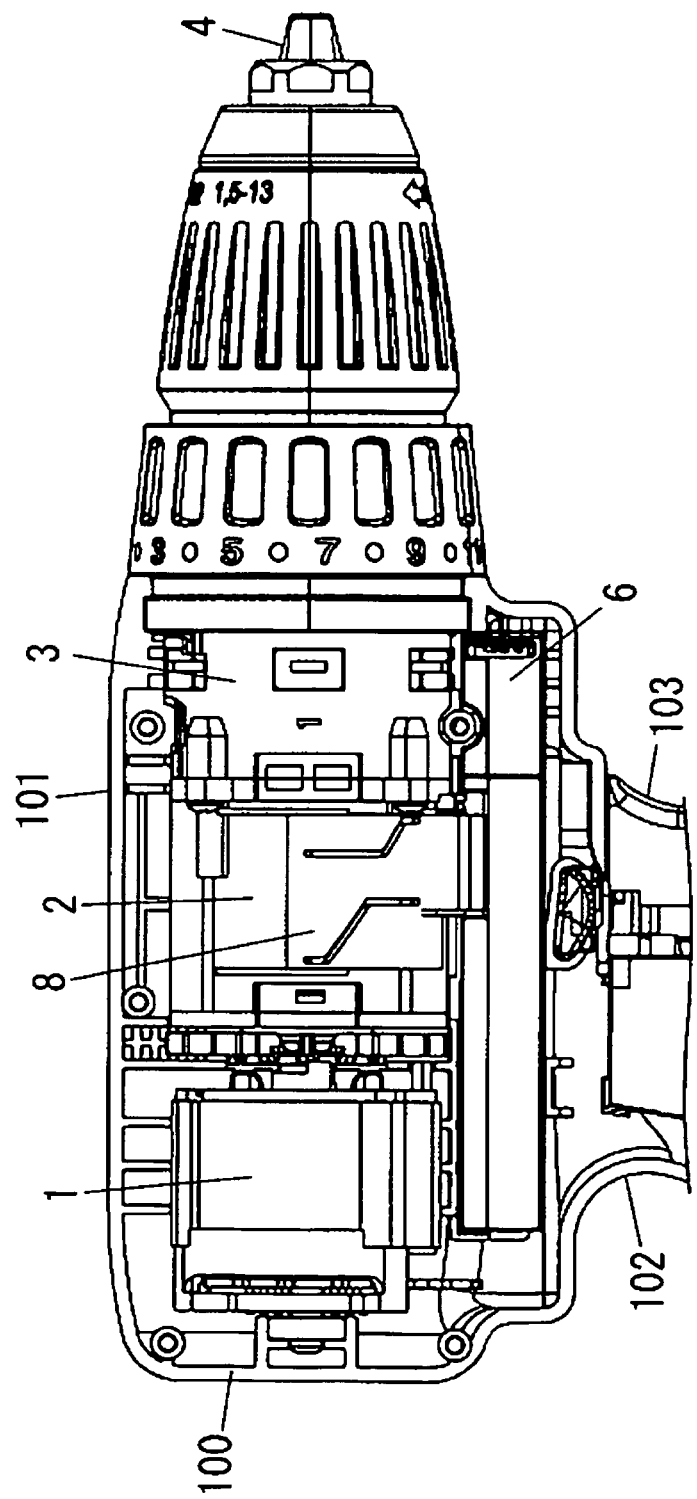
FIG. 2 is an internal side view of the electric power tool.
Figure 3:
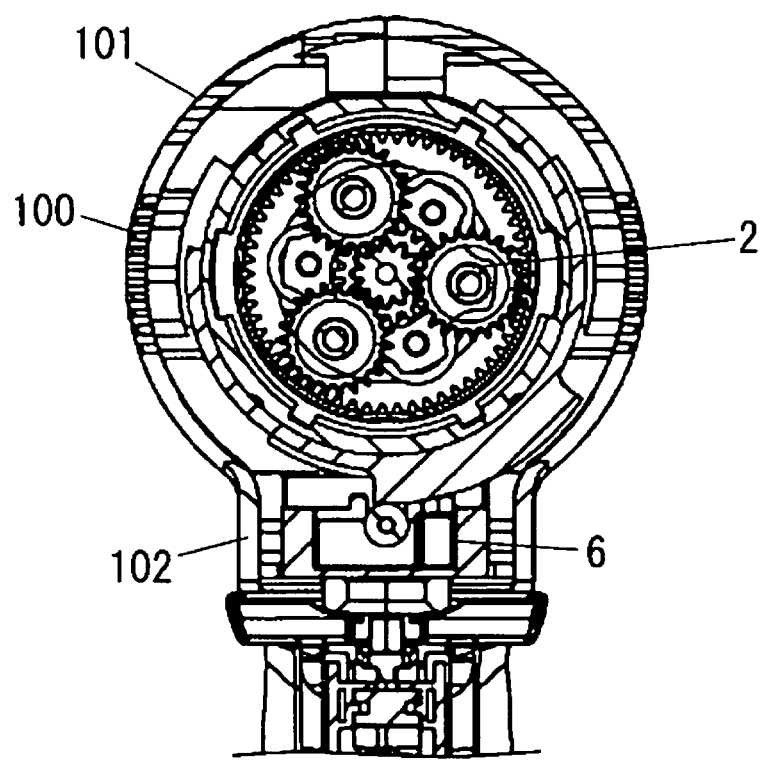
FIG. 3 is a rear section view of the electric power tool.
Figure 4:
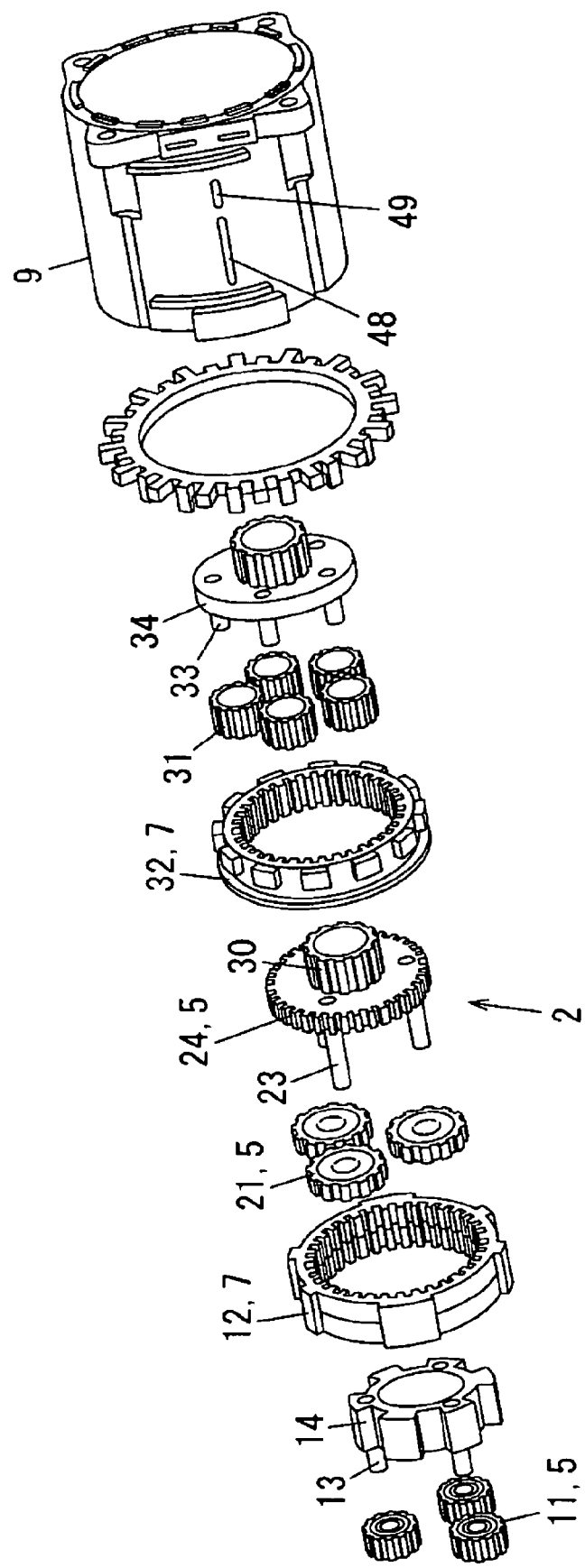
FIG. 4 is an exploded perspective view showing a speed reduction mechanism employed in the electric power tool.

FIGS. 1 through 3 show an electric power tool in accordance with a first embodiment of the present invention. The electric power tool of the present embodiment includes a motor (main motor) 1 as a drive power source, a speed reduction mechanism 2 for transferring the rotational power of the motor 1 at a reduced speed, a drive power delivery unit 3 for delivering the rotational power transferred from the speed reduction mechanism 2 to an output shaft 4, and a trunk housing 101 for accommodating the motor 1, the speed reduction mechanism 2 and the drive power delivery unit 3. A grip housing 102 extends from the trunk housing 101. A trigger switch 103 is retractably attached to the grip housing 102. The trunk housing 101 and the grip housing 102 make up a body housing 100 of the electric power tool.

A shift actuator 6 is arranged within the trunk housing 101 in a parallel relationship with the motor 1 and the speed reduction mechanism 2. The shift actuator 6 is of a rotary type and is designed to change a reduction ratio by slidingly moving a changeover member 7 of the speed reduction mechanism 2 through a shift cam plate 8. Detailed description will be made later on this point.

In FIGS. 4 through 10, there are shown the structures of the speed reduction mechanism 2 and other components in more detail. The speed reduction mechanism 2 of the present embodiment includes a gear case 9 and three planetary gear mechanisms arranged within the gear case 9. The reduction ratio of the speed reduction mechanism 2 as a whole is changed by changing over the reduction state and non-reduction state of the respective planetary gear mechanisms. In the following description, the planetary gear mechanisms will be referred to as first to third planetary gear mechanisms in the order of proximity to the motor 1.

The first planetary gear mechanism includes a sun gear (not shown in FIG. 4) rotationally driven about its axis by the rotational power of the motor 1, a plurality of planet gears 11 arranged to surround the sun gear 10 and meshed with the sun gear 10, a ring gear 12 arranged to surround the planet gears 11 and meshed with the planet gears 11, and a carrier 14 to which the planet gears 11 are rotatably connected through carrier pins 13.

The second planetary gear mechanism includes a sun gear 20 (not shown in FIG. 4) coupled with the sun gear 10 of the first planetary gear mechanism, a plurality of planet gears 21 arranged to surround the sun gear 20 and meshed with the sun gear 20, the ring gear 12 capable of meshing with the planet gears 21, and a carrier 24 to which the planet gears 21 are rotatably connected through carrier pins 23.

The ring gear 12 is configured to act as a member of the first planetary gear mechanism or as a member of the second planetary gear mechanism depending on the slide positions of the ring gear 12. In other words, the ring gear 12 meshes with the planet gears 11 of the first planetary gear mechanism when being in the slide position near the motor 1 but meshes with the planet gears 21 of the second planetary gear mechanism when being in the slide position near the output shaft 4.

In the description made below, the side near the motor 1 will be referred to as "input side" and the side near the output shaft 4 will be referred to as "output side."

On the inner circumferential surface of the gear case 9, there is provided a guide portion 15 with which the ring gear 12 engages in an axially slidable and non-rotatable manner. The ring gear 12 makes axial slide movement under the guidance of the guide portion 15.

The third planetary gear mechanism includes a sun gear 30 coupled with the carrier 24 of the second planetary gear mechanism, a plurality of planet gears 31 arranged to surround the sun gear 30 and meshed with the sun gear 30, a ring gear 32 meshed with the planet gears 31, and a carrier 34 to which the planet gears 31 are rotatably connected through carrier pins 33.

The ring gear 32 is axially slidably and rotatably arranged with respect to the gear case 9. When being in the input side slide position, the ring gear 32 meshes with the outer peripheral edge of the carrier 24 of the second planetary gear mechanism. When being in the output side slide position, the ring gear 32 meshes with an engaging tooth portion 40 integrally formed with the gear case 9. The ring gear 32 remains meshed with the planet gears 31 in either of the slide positions.

The first to third planetary gear mechanisms are axially connected to one another. Specifically, the sun gears 10, 20 and 30 of the first to third planetary gear mechanisms are linearly arranged in the axial direction. Likewise, the ring gears 12 and 32 surrounding the sun gears 10, 20 and 30 are linearly arranged in the axial direction.

The ring gears 12 and 32 are independently slidable in the axial direction. The reduction ratio is changed depending on the slide positions of the ring gears 12 and 32, consequently changing the rotation output of the output shaft 4 to a first speed, a second speed or a third speed. In the present embodiment, each of the ring gears 12 and 32 serves as the axially movable changeover member 7. In this regard, the first speed is available when the reduction ratio is smallest, the second speed is available when the reduction ratio is greater than that of the first speed, and the third speed is available when the reduction ratio is greater than those of the first and second speeds (when the reduction ratio is greatest).

Figure 7:
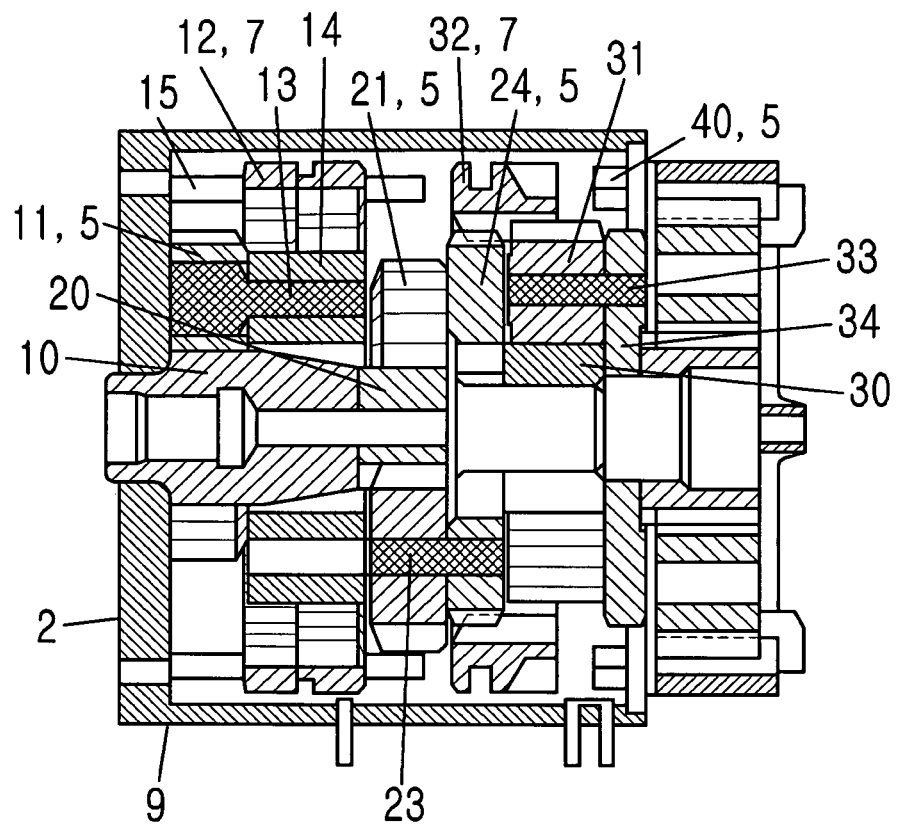
FIG. 7 is a side section view of the speed reduction mechanism in which the shift operation between a first speed and a second speed is underway.
Figure 9:
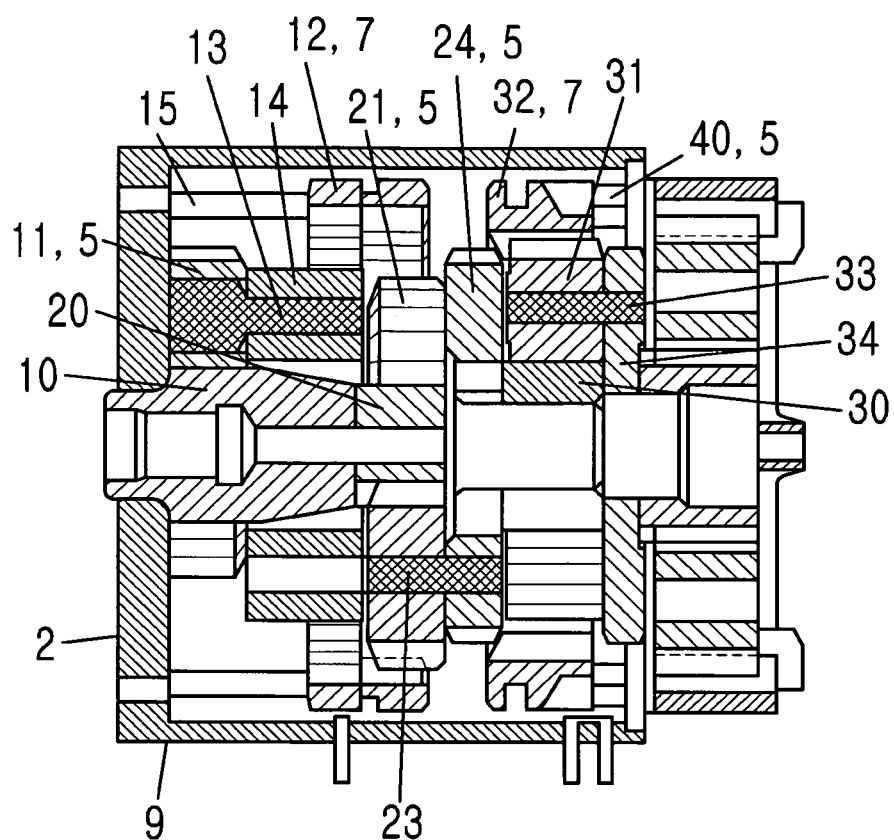
FIG. 9 is a side section view of the speed reduction mechanism in which the shift operation between a second speed and a third speed is underway.

FIGS. 6A and 6B show the speed reduction mechanism 2 kept in a first speed state. FIG. 7 shows the speed reduction mechanism 2 in which the shift operation between the first speed and the second speed is underway. FIGS. 8A and 8B show the speed reduction mechanism 2 kept in a second speed state. FIG. 9 shows the speed reduction mechanism 2 in which the shift operation between the second speed and the third speed is underway. FIGS. 10A and 10B show the speed reduction mechanism 2 kept in a third speed state.

In case of the speed reduction mechanism 2 being in the first speed state as shown in FIGS. 6A and 6B, the ring gear 12 serving as the changeover member 7 is held in the input side slide position and the ring gear 32 serving as the changeover member 7 is also held in the input side slide position. As a result, only the first planetary gear mechanism comes into a reduction state.

Specifically, the planet gears 11 meshing with the ring gear 12 make rotation on their own axes and revolution around the sun gear 10 by the rotation of the sun gear 10. Thus, the torque of the sun gear 10 is transferred to the carrier 14 at a reduced speed. The carrier 14 rotates together with the carrier 24 of the second planetary gear mechanism. Likewise, the third planetary gear mechanism rotates together with the carrier 24.

In case of the speed reduction mechanism 2 being in the second speed state as shown in FIGS. 8A and 8B, the ring gear 12 serving as the changeover member 7 is held in the output side slide position but the ring gear 32 serving as the changeover member 7 is held in the input side slide position. As a result, only the second planetary gear mechanism comes into a reduction state.

Specifically, the planet gears 21 of the second planetary gear mechanism meshing with the ring gear 12 make rotation on, their own axes and revolution around the sun gear 10 by the rotation of the sun gear 20 coupled with the sun gear 10. Thus, the torque of the sun gear 20 is transferred to the carrier 24 at a reduced speed. The first and third planetary gear mechanisms rotate together with the carrier 24.

In this regard, the dimensions of the respective members of the first and second planetary gear mechanisms are set differently so that the reduction ratio of the second planetary gear mechanism can be greater than the reduction ratio of the first planetary gear mechanism. Accordingly, the reduction ratio in the second speed is greater than that in the first speed, and the rotation speed of the output shaft 4 in the second speed becomes smaller than that in the first speed.

In case of the speed reduction mechanism 2 being in the third speed state as shown in FIGS. 10A and 10B, the ring gear 12 serving as the changeover member 7 is held in the output side slide position and the ring gear 32 serving as the changeover member 7 is also held in the output side slide position. As a result, the second and third planetary gear mechanisms come into a reduction state.

Specifically, the planet gears 21 of the second planetary gear mechanism meshing with the ring gear 12 make rotation on their own axes and revolution around the sun gear 20 by the rotation of the sun gear 20 coupled with the sun gear 10. Thus, the torque of the sun gear 20 is transferred to the carrier 24 at a reduced speed. The first planetary gear mechanism rotates together with the carrier 24 of the second planetary gear mechanism. The torque of the carrier 24 is transferred to the sun gear 30 of the third planetary gear mechanism coupled with the carrier 24. The planet gears 31 of the third planetary gear mechanism meshing with the ring gear 32 make rotation on their own axes and revolution around the sun gear 30 by the rotation of the sun gear 30. Thus, the torque of the sun gear 30 is transferred to the carrier 34 at a further reduced speed.

The slide positions of the two ring gears 12 and 32 making up the changeover member 7 are determined by the rotational positions of the shift cam plate 8. The shift cam plate 8 is a plate having an arc-like cross-sectional shape conforming to the outer circumferential surface of the cylindrical gear case 9. The shift cam plate 8 is provided rotatably about the center axis of the gear case 9.

The shift cam plate 8 has input side and output side cam slots 41 and 42 arranged side by side along the axial direction. The input side cam slot 41 is a through-groove curved in conformity with the slide movement of the ring gear 12. The tip end portion of a shift pin 45 passing through the cam slot 41 is inserted into the gear case 9 through a guide hole 48 (see FIG. 4) formed through the thickness of the gear case 9. The tip end portion of the shift pin 45 engages with a depression formed on the outer circumferential surface of the ring gear 12. The guide hole is formed to extend parallel to the axis of the speed reduction mechanism 2.

The output side cam slot 42 is a through-hole curved in conformity with the slide movement of the ring gear 32. The tip end portion of a shift pin 46 passing through the cam slot 42 is inserted into the gear case 9 through a guide hole 49 (see FIG. 4) formed through the thickness of the gear case 9. The tip end portion of the shift pin 46 engages with a depression formed on the outer circumferential surface of the ring gear 32. The guide hole is formed to extend parallel to the axis of the speed reduction mechanism 2 and is arranged linearly with the guide hole 48.

The shift cam plate 8 includes a gear portion 47 formed in one circumferential end portion thereof to mesh with the rotary shift actuator 6. The shift actuator 6 includes a dedicated motor (sub-motor) 50, a speed reducing mechanism 51 for transferring the rotational power of the motor 50 at a reduced speed, and an output unit 52 rotationally driven by the rotational power transferred through the speed reducing mechanism 51.

In the electric power tool of the present embodiment, the speed reduction mechanism 2 includes the axially slidable changeover member 7 and a gear member 5, the changeover member 7 being engaged with or disengaged from the gear member 5 depending on the axial slide position thereof.

As mentioned above, the changeover member 7 includes the ring gears 12 and 32. Further, with respect to the ring gear 12, the planet gears 11 of the first planetary gear mechanism and the planet gears 21 of the second planetary gear mechanism serve as the gear members 5. In respect of the ring gear 32, the carrier 24 of the second planetary gear mechanism and the engaging tooth portion 40 of the gear case 9 serve as the gear members 5. The reduction ratio of the speed reduction mechanism 2 as a whole is changed depending on the engagement and disengagement states of the changeover member 7 and the gear member 5.

Figure 5:
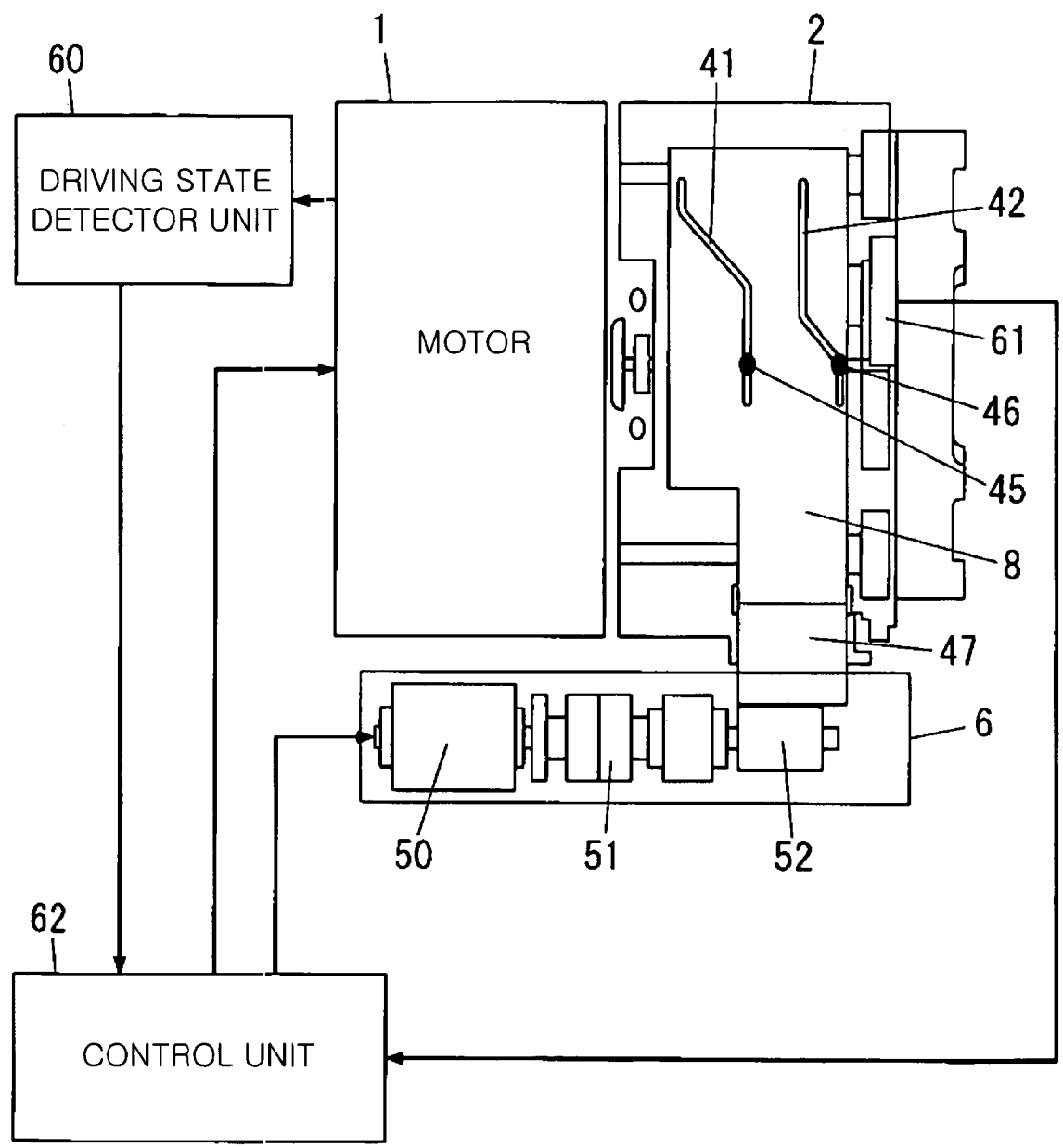
FIG. 5 is an explanatory view showing major parts of the electric power tool.

As schematically shown in FIG. 5, the electric power tool of the present embodiment includes a driving state detector unit 60 for detecting the driving state of the motor 1, a slide position detector unit 61 for detecting the slide positions of the changeover member 7, and a control unit 62 for controlling the operations of the motors 1 and 50.

The driving state detector unit 60 detects the driving state of the motor 1 by detecting at least one of the current flowing through the motor 1 and the rotational speed of the motor 1. The detection result of the driving state detector unit 60 is inputted to the control unit 62. The slide position detector unit 61 indirectly detects the positions of the changeover members 7 (i.e., the slide positions of the ring gears 12 and 32) by detecting the rotational position of the shift cam plate 8 (interlocked with the changeover member 7) with respect to the gear case 9. The detection result of the slide position detector unit 61 is inputted to the control unit 62. The slide position detector unit 61 may be either a contactless displacement detecting sensor or a contact type sensor making direct contact with the shift cam plate 8.

Depending on the driving states of the motor 1 detected by the driving state detector unit 60, the control unit 62 starts up the shift actuator 6 and slidingly moves the changeover member 7, thereby changing the reduction ratio of the speed reduction mechanism 2.

In the electric power tool of the present embodiment, a reduction ratio changing unit is made up of the shift actuator 6 for axially sliding the changeover member 7, the driving state detector unit 60 for detecting the driving state of the motor 1, the slide position detector unit 61 for detecting the slide positions of the changeover member 7 and the control unit 62 for operating the shift actuator 6 depending on the detection result of the driving state detector unit 60.

When operating the shift actuator 6 (i.e., the motor 50), the control unit 62 controls the motor 1 so that the rotational power thereof can be temporarily decreased or increased depending on the detection result of the slide position detector unit 61. In this regard, the reason for decreasing or increasing the rotational power of the motor 1 is to reduce the relative rotation speed between the changeover member 7 and the sliding gear member 5 to a possible smallest value (preferably, to zero) when the changeover member 7 is engaged with the gear member 5.

Next, the automatic shifts from the first speed to the second speed, from the second speed to the third speed, from the third speed to the second speed and from the second speed to the first speed will be described one after another.

The automatic shift from the first speed to the second speed is controlled in the following manner. The first speed is automatically shifted to the second speed if the driving state detector unit 60 detects that the load of the motor 1 has reached a specified level while the motor 1 is driven in the first speed state shown in FIGS. 6A and 6B.

Specifically, if the current flowing through the motor 1 becomes equal to or greater than a specified value, if the revolution number of the motor 1 becomes equal to or smaller than a specified value, or if the current and the revolution number satisfy a specified relationship, the driving state detector unit 60 detects that the load of the motor 1 has reached the specified level.

Upon receiving the detection result, the control unit 62 starts up the motor 50 of the shift actuator 6 to rotate the shift cam plate 8. The shift pin 45 passing through the input side cam slot 41 of the shift cam plate 8 is slid toward the output side under the guidance of the guide hole 48 provided in the gear case 9. The shift pin 45 slidingly moves the corresponding ring gear 12 as the changeover member 7 toward the output side.

The slidingly moved ring gear 12 is disengaged from the planet gears 11 of the first planetary gear mechanism and comes into the changeover progressing state shown in FIG. 7.

At this time, the ring gear 12 is held against rotation with respect to the gear case 9. In the meantime, the planet gears 21 of the second planetary gear mechanism, which are the gear member 5 to be engaged next time, are rotationally driven about the axis of the speed reduction mechanism 2 with respect to the gear case 9 by the rotational power of the motor 1.

If the detection result indicating that the ring gear 12 has reached the changeover progressing state shown in FIG. 7 is inputted from the slide position detector unit 61, the control unit 62 temporarily reduces the rotational power of the motor 1 (to a value including zero) at that moment. As a result, engagement shocks can be suppressed by reducing the relative rotation speed between the ring gear 12 and the planet gears 21 (preferably, to zero) when the ring gear 12 is engaged with the planet gears 21 as shown in FIGS. 8A and 8B. This realizes a smooth and stable automatic shift operation and restrains wear or damage of the gears otherwise caused by collision.

Alternatively, the control unit 62 may control the motor 1 in such a manner that the rotational power of the motor 1 is reduced to a certain level from the startup time of the shift actuator 6. In this case, the control unit 62 may gradually reduce the rotational power of the motor 1 in synchronism with the startup of the shift actuator 6 and may further reduce the rotational power of the motor 1 at the input time of the detection result indicating that the ring gear 12 has reached the changeover progressing state shown in FIG. 7.

The automatic shift from the second speed to the third speed is controlled in the following manner. The second speed is automatically shifted to the third speed if the driving state detector unit 60 detects that the load of the motor 1 has reached a specified level while the motor 1 is driven in the second speed state shown in FIGS. 8A and 8B. Specifically, if the current flowing through the motor 1 becomes equal to or greater than a specified value, if the revolution number of the motor 1 becomes equal to or smaller than a specified value, or if the current and the revolution number satisfy a specified relationship, the driving state detector unit 60 detects that the load of the motor 1 has reached the specified level.

Upon receiving the detection result, the control unit 62 starts up the motor 50 of the shift actuator 6 to rotate the shift cam plate 8. The shift pin 46 passing through the output side cam slot 42 of the shift cam plate 8 is slid toward the output side under the guidance of the guide hole 49 provided in the gear case 9. The shift pin 46 slidingly moves the corresponding ring gear 32 as the changeover member 7 toward the output side.

The slidingly moved ring gear 32 is disengaged from the carrier 24 of the second planetary gear mechanism and comes into the changeover progressing state shown in FIG. 9. At this time, the ring gear 32 engages with the planet gears of the third planetary gear mechanism and remains not fixed to the gear case 9 against rotation.

The ring gear 32 coming into the changeover progressing state shown in FIG. 9 is continuously rotated by the rotary inertia generated when the ring gear 32 engages with the carrier 24 in the second speed state but, at the same time, is applied with the torque acting in the opposite direction to the rotary inertia due to the reaction force of the planet gears 31 of the third planetary gear mechanism driven by the motor 1. In the meantime, the engaging tooth portion 40, which is the gear member 5 to be engaged with the ring gear 32 next, is fixed with respect to the gear case 9.

The control unit 62 reduces the relative rotation speed between the ring gear 32 and the engaging tooth portion 40 (preferably, to zero) by positively using the torque acting in the opposite direction to the rotary inertia. Therefore, if the slide position detector unit 61 detects that the ring gear 32 has reached the changeover progressing state shown in FIG. 9, the control unit 62 first stops the slide movement of the ring gear 32 at that moment. Then, the control unit 62 temporarily increases the rotational power of the motor 1 to rapidly reduce the rotation speed of the ring gear 32 with respect to the gear case 9. Thereafter, the control unit 62 allows the ring gear 32 to make slide movement again and performs control so that the rotation speed of the ring gear 32 can become nearly zero when the ring gear 32 engages with the engaging tooth portion 40.

This helps suppress engagement shocks when the ring gear 32 engages with the engaging tooth portion 40, which makes it possible to realize a smooth and stable automatic shift operation and to restrains wear or damage of the gears otherwise caused by collision.

The relative rotation speed between the ring gear 32 and the engaging tooth portion 40 may be controlled only by temporarily increasing the rotational power of the motor 1 without having to first stop the slide movement of the ring gear 32. The relative rotation speed may be controlled only by first stopping the ring gear 32. The relative rotation speed may be controlled by gradually decreasing the rotational power of the motor 1 in synchronism with the startup of the shift actuator 6 and consequently reducing the rotational power of the ring gear 32 caused by the rotary inertia when the ring gear 32 engages with the carrier 24 in the second speed state.

The automatic shift from the third speed to the second speed is controlled in the following manner. The third speed is automatically shifted to the second speed if the driving state detector unit 60 detects that the load of the motor 1 has reached a specified level while the motor 1 is driven in the third speed state shown in FIGS. 10A and 10B.

Specifically, if the current flowing through the motor 1 becomes equal to or smaller than a specified value, if the revolution number of the motor 1 becomes equal to or greater than a specified value, or if the current and the revolution number satisfy a specified relationship, the driving state detector unit 60 detects that the load of the motor 1 has reached the specified level.

Upon receiving the detection result, the control unit 62 starts up the motor 50 of the shift actuator 6 to rotate the shift cam plate 8. The shift pin 46 passing through the output side cam slot 42 of the shift cam plate 8 causes the corresponding ring gear 32 as the changeover member 7 to slide toward the input side.

The slidingly moved ring gear 32 is first disengaged from the engaging tooth portion 40 and comes into the changeover progressing state shown in FIG. 9. At this time, the ring gear 32 is engaged with the planet gears 31 of the third planetary gear mechanism and is not fixed to the gear case 9 against rotation.

The ring gear 32 coming into the changeover progressing state shown in FIG. 9 is applied with the torque acting in the opposite direction to the rotating direction of the motor 1 due to the reaction force of the planet gears 31 of the third planetary gear mechanism driven by the motor 1. In the meantime, the carrier 24 of the second planetary gear mechanism, which is the gear member 5 to be engaged with the ring gear 32 next, is rotated in the same direction as the rotating direction of the motor 1.

If the detection result indicating that the ring gear 32 has reached the changeover progressing state shown in FIG. 9 is inputted from the slide position detector unit 61, the control unit 62 temporarily reduces the rotational power of the motor 1 (to a value including zero) at that moment. As a result, engagement shocks can be suppressed by reducing the relative rotation speed between the ring gear 32 and the carrier 24 (preferably, to zero) when the ring gear 32 engages with the carrier 24 as shown in FIGS. 8A and 8B. This realizes a smooth and stable automatic shift operation and restrains wear or damage of the gears otherwise caused by collision.

Alternatively, the control unit 62 may control the motor 1 in such a manner that the rotational power of the motor 1 is reduced to a certain level from the startup time of the shift actuator 6. In this case, the control unit 62 may gradually reduce the rotational power of the motor 1 in synchronism with the startup of the shift actuator 6 and may further reduce the rotational power of the motor 1 at the input time of the detection result indicating that the ring gear 32 has reached the changeover progressing state shown in FIG. 9.

The automatic shift from the second speed to the first speed is controlled in the following manner. The second speed is automatically shifted to the first speed if the driving state detector unit 60 detects that the load of the motor 1 has reached a specified level while the motor 1 is driven in the second speed state shown in FIGS. 8A and 8B. Specifically, if the current flowing through the motor 1 becomes equal to or smaller than a specified value, if the revolution number of the motor 1 becomes equal to or greater than a specified value, or if the current and the revolution number satisfy a specified relationship, the driving state detector unit 60 detects that the load of the motor 1 has reached the specified level.

Upon receiving the detection result, the control unit 62 starts up the motor 50 of the shift actuator 6 to rotate the shift cam plate 8. The shift pin 45 passing through the input side cam slot 41 of the shift cam plate 8 causes the corresponding ring gear 12 as the changeover member 7 to slide toward the input side.

The slidingly moved ring gear 12 is first disengaged from the planet gears 21 of the second planetary gear mechanism and comes into the changeover progressing state shown in FIG. 7. At this time, the ring gear 12 remains fixed to the gear case 9 against rotation. In the meantime, the planet gears 11 of the first planetary gear mechanism, which is the gear member 5 to be engaged next time, is rotationally driven about the axis of the speed reduction mechanism 2 with respect to the gear case 9 by the rotational power of the motor 1.

If the detection result indicating that the ring gear 12 has reached the changeover progressing state shown in FIG. 7 is inputted from the slide position detector unit 61, the control unit 62 temporarily reduces the rotational power of the motor 1 at that moment. As a result, engagement shocks can be suppressed by reducing the relative rotation speed between the ring gear 12 and the planet gears 11 (preferably, to zero) when the ring gear 12 engages with the planet gears 11 as shown in FIGS. 6A and 6B. This realizes a smooth and stable automatic shift operation and restrains wear or damage of the gears otherwise caused by collision.

Alternatively, the control unit 62 may control the motor 1 in such a manner that the rotational power of the motor 1 is reduced to a certain level from the startup time of the shift actuator 6. In this case, the control unit 62 may gradually reduce the rotational power of the motor 1 in synchronism with the startup of the shift actuator 6 and may further reduce the rotational power of the motor 1 at the input time of the detection result indicating that the ring gear 12 has reached the changeover progressing state shown in FIG. 7.

As described above, the control unit 62 of the electric power tool in accordance with the present embodiment starts up the shift actuator 6 depending on the driving state of the motor 1 and temporarily decrease or increase the rotational power of the motor 1 in conformity with the current positions of the changeover member 7 (the ring gears 12 and 32) detected by the sensor. The reduction of the rotational power includes the stoppage of the motor 1. This realizes a smooth and stable automatic shift operation and restrains wear or damage of gears otherwise caused by collision. The control unit 62 may be designed to gradually decrease or increase the rotational power of the motor 1 in synchronism with the startup of the shift actuator 6.

The control unit 62 of the present embodiment changes the drive control of the shift actuator 6 in conformity with the positions of the changeover member 7 (the ring gears 12 and 32) detected by the slide position detector unit 61. This realizes a smooth and stable automatic shift operation and restrains wear or damage of gears otherwise caused by collision.

Next, detailed description will be made on how to control the shift actuator 6.

By driving the shift actuator 6, the control unit 62 causes the changeover member 7 (the ring gear 12 or the ring gear 32) to engage with the target gear member 5 (the planet gears 11, the planet gears 21, the carrier 24 or the engaging tooth portion 40). At this time, it is sometimes the case that the teeth of the changeover member 7 and the gear member 5 may not successfully engage with each other and the changeover member 7 may fail to slide to a desired target position. In this case, the shift operation is not performed successfully, thereby hindering the works. Moreover, heavy load is applied to the shift actuator 6, which may be a cause of trouble.

In contrast, the control unit 62 of the present embodiment is designed to temporarily reverse the rotating direction of the motor 50 of the shift actuator 6 if the detection result inputted from the slide position detector unit 61 indicates that the changeover member 7 fails to slide to a desired target position. In other words, the direction in which the changeover member 7 is slid by the shift cam plate 8 is reversed for a specified time period, thereby causing the changeover member 7 to move away from the target gear member 5.

The relative rotational positions of the changeover member 7 and the gear member 5 are changed by the motor 1 while the changeover member 7 and the gear member 5 are kept spaced apart from each other. Therefore, if the changeover member 7 is slid toward the gear member 5 by rotating the motor 50 of the shift actuator 6 in the forward direction, the changeover member 7 and the gear member 5 are made easy to successfully mesh with each other. When there occurs again such a situation that the changeover member 7 fails to slide to a desired target position, the control unit 62 repeats the same control as mentioned above. The control unit 62 may be designed to stop the motor 1 when the aforementioned situation occurs a specified number of times.

Next, other embodiments of the electric power tool in accordance with the present invention will be described one after another. The same configurations as those of the first embodiment will not be described in detail and description will be mainly focused on the characteristic configurations differing from the configurations of the first embodiment.

Second Embodiment

In the electric power tool of the present embodiment, the drive control of the shift actuator 6 is changed if the gears do not successfully engage with each other and the shift operation fails. This realizes a smooth and stable automatic shift operation and restrains wear or damage of gears otherwise caused by collision. The present embodiment differs from the first embodiment in the method of changing the drive control of the shift actuator 6.

Specifically, if the detection result of the slide position detector unit 61 reveals that the changeover member 7 fails to slide to a desired target position, the control unit 62 changes the drive control of the shift actuator 6 so that the rotational power of the motor 50 of the shift actuator 6 can be increased. In other words, the changeover member 7 and the gear member 5 are made easy to mesh with each other by changing the sliding drive power with which the changeover member 7 is slid by the shift cam plate 8.

The sliding drive power can be properly changed not only by increasing the rotational power of the motor 50 but also by first decreasing the rotational power and then increasing the same or by repeating the decrease and increase of the rotational power in a specified cycle. The control unit 62 may be designed to stop the motor 1 when the changeover member 7 fails to slide to the desired target position despite the change of the sliding drive power.

Third Embodiment

In the electric power tool of the present embodiment, the relative rotational position of the changeover member 7 and the gear member 5 is changed if the gears do not successfully engage with each other and the shift operation fails. This realizes a smooth and stable automatic shift operation and restrains wear or damage of gears otherwise caused by collision. The present embodiment differs from the first embodiment in the method of changing the control in the case of the failure of the shift operation.

Specifically, if it is determined that the changeover member 7 fails to slide to a desired target position and the motor is hardly driven, the control unit 62 changes the rotational power of the motor 1 while maintaining the operation of the shift actuator 6. In other words, such control is carried out if the detection result of the slide position detector unit 61 reveals that the changeover member fails to slide to a desired target position while the shift actuator 6 is driven after the rotational power of the motor 1 is first changed.

More specifically, if it is determined from the detection result of the slide position detector unit 61 that the rotational power of the motor 1 is completely or substantially stopped and the motor is not driven, the control unit 62 increases the rotational power of the motor 1 while maintaining the operation of the shift actuator 6.

When increasing the rotational power of the motor 1, the control unit 62 changes the rotational power of the motor 1 such that the rotational acceleration of the rotational power becomes increased in the case where the changeover member 7 makes the slide movement compared with case where the changeover member 7 makes no slide movement.

Specifically, the control unit 62 controls the rotational power of the motor 1 such that the rotational acceleration of the rotational power becomes increased in the case that the gears engage with each other and the changeover member 7 makes the slice movement compared with the case where the gears do not successfully engage with each other and the changeover member 7 makes no slice movement.

The rotational power (sliding drive power) of the motor 50 may be maintained merely, but the sliding drive power may be properly changed by first decreasing the rotational power and then increasing the same or by repeating the decrease and increase of the rotational power in a specified cycle. The control unit 62 may be designed to stop the motor 1 when the changeover member 7 fails to slide to the desired target position despite the change of the sliding drive power.

Further, the state where the motor 1 is hardly driven includes the case of reducing the rotational power of the motor 1 in the shift operation and the case of stopping the driving of the motor 1 in accordance with the determination of work completion made by the control unit 62. Specifically, the stopping of the motor 1 includes the state where the load of the motor 1 is substantially removed after reaching a predetermined level and the control unit 62 determinates that the work is completed and the state where the operation of the trigger switch 103 is released. In the automatic shift in such states, the control unit 62 controls the stopped motor 1 to be driven if the shift operation fails.

Fourth Embodiment

In the electric power tool of the present embodiment, the relative rotational position of the changeover member 7 and the gear member 5 is changed if the gears do not successfully engage with each other and the shift operation fails. This realizes a smooth and stable automatic shift operation and restrains wear or damage of the gears otherwise caused by collision.

The present embodiment differs from the first embodiment in the control method in case that the shift operation fails. In the meantime, the present embodiment is the same as the third embodiment in that the control is carried out when the changeover member 7 is not slid to a desired target position and it is determined that the motor 1 is hardly driven. However, the present embodiment differs from the third embodiment in the control method after the determination.

Specifically, if it is determined that the shift operation fails or the motor 1 is hardly driven, the control unit 62 first stops the driving of the shift actuator 6 and increase the rotational power of the motor 1. Then, the control unit 62 controls the shift actuator 6 to be driven again. In other words, if the shift operation fails, the control unit 62 stops the driving of the shift actuator 6 and then controls the shift actuator 6 to be driven again after increasing the rotational power of the motor 1.

When increasing the rotational power of the motor 1, the control unit 62 changes the rotational power of the motor 1 such that the rotational acceleration of the rotational power becomes increased in the case that the changeover member makes the slide movement compared with the case that the changeover member 7 makes no slide movement.

Specifically, the control unit 62 controls the rotational power of the motor 1 such that the rotational acceleration of the rotational power becomes increased in the case that the gears successfully engage with each other and the changeover member 7 makes the slide movement compared with the case that the gears do not successfully engage with each other and the changeover member 7 makes no slide movement.

The rotational power of the motor 1 may be increased merely, but the rotational power may be properly changed by first decreasing the rotational power and then increasing the same or by repeating the decrease and increase of the rotational power in a specified cycle. The control unit 62 may be designed to stop the motor 1 when the changeover member 7 fails to slide to the desired target position despite the change of the sliding drive power.

Further, the state where the motor 1 is hardly driven includes the case of reducing the rotational power of the motor 1 in the shift operation and the case of stopping the driving of the motor 1 in accordance with the determination of work completion made by the control unit 62. Specifically, the stopping of the motor 1 includes the state where the load of the motor 1 is substantially removed after reaching a predetermined level and the control unit 62 determinates that the work is completed and the state where the operation of the trigger switch 103 is released. In the automatic shift in such states, the control unit 62 controls the stopped motor 1 to be driven if the shift operation fails.

Fifth Embodiment

The electric power tool of the present embodiment differs from that of the first embodiment in terms of the slide position detector unit 61. The slide position detector unit 61 employed in the present embodiment does not detect the position of other member (e.g., the shift cam plate 8) interlocked with the changeover member 7 as in the first embodiment but directly detects the positions of the changeover member 7.

Figure 11A:
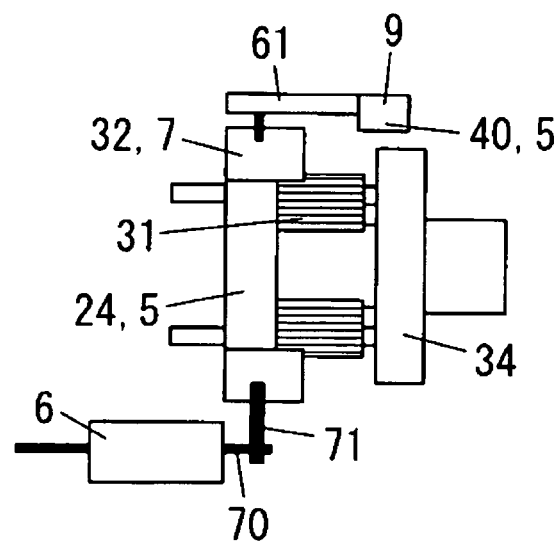
FIGS. 11A to 11C are explanatory views showing major parts of an electric power tool in accordance with a third embodiment of the present invention, FIG. 11A illustrating a second speed state, FIG. 11B illustrating the ongoing shift operation from a second speed to a third speed and FIG. 11C illustrating a third speed state.
Figure 11B:
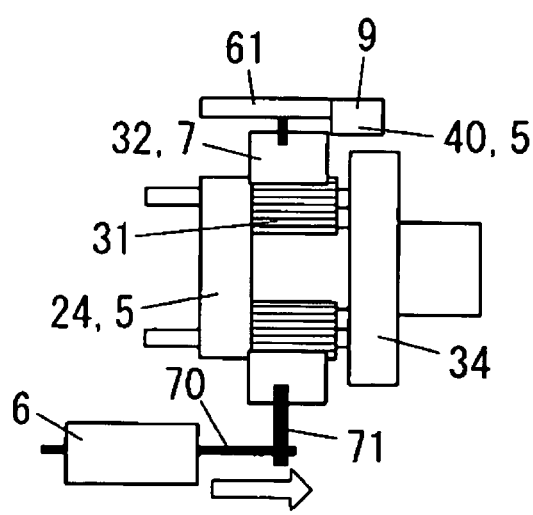
Figure 11C:
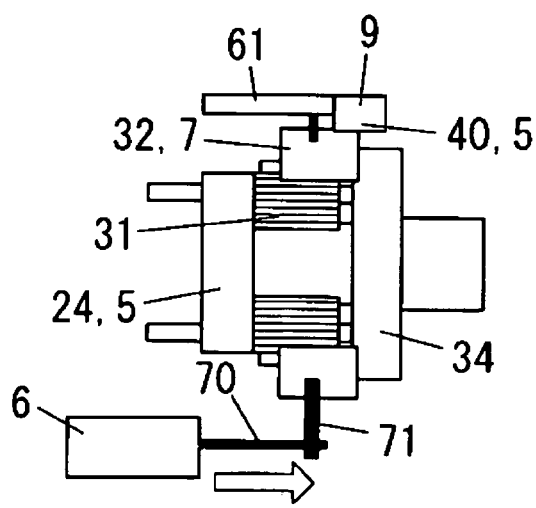

FIGS. 11A, 11B and 11C schematically show the slide position detector unit 61 employed in the present embodiment. In case of the present embodiment, the shift actuator 6 is a linear actuator formed of a solenoid. The shift actuator 6 includes a plunger 70 whose axial protrusion amount is changeable. The ring gear 32 included in the changeover member 7 is connected to the plunger 70 through a connecting member 71. The ring gear 32 is rotatable about the axis of the speed reduction mechanism 2 with respect to the connecting member 71 and is axially slidable together with the connecting member 71.

The slide position detector unit 61 is a displacement detecting sensor installed in the gear case 9 so that it can be positioned radially outwards of the ring gear 32. While this sensor is of a contact type making direct contact with the ring gear 32, a contactless sensor may be used in place thereof.

Sixth Embodiment

The electric power tool of the present embodiment differs from that of the first embodiment in terms of the slide position detector unit 61. The slide position detector unit 61 employed in the present embodiment does not detect the position of other member (e.g., the shift cam plate 8) interlocked with the changeover member 7 but detects the driving state of the shift actuator 6 to indirectly detect the positions of the changeover member 7 based on the detection result.

Figure 12:
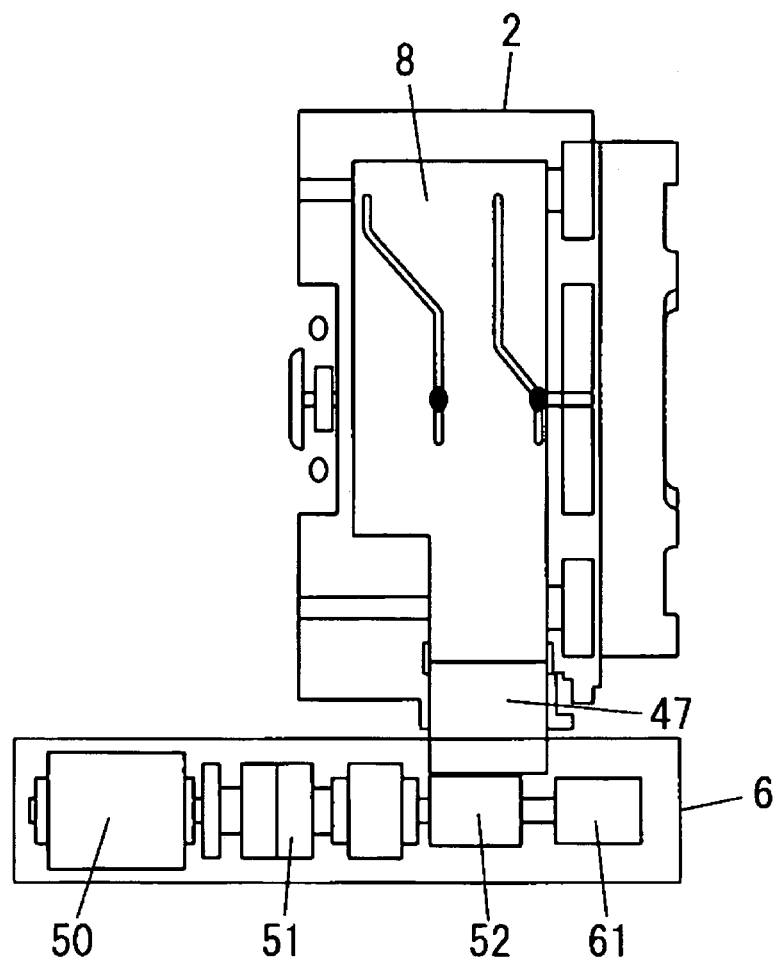
FIG. 12 is an explanatory view showing major parts of an electric power tool in accordance with a sixth embodiment of the present invention.

FIG. 12 schematically shows the slide position detector unit 61 employed in the present embodiment. The slide position detector unit 61 of the present embodiment is a displacement sensor for detecting the rotational position of an output unit 52 of the rotary shift actuator 6. This displacement sensor may be either a contact type sensor making direct contact with the output unit 52 or a contactless sensor.

Seventh Embodiment

The electric power tool of the present embodiment differs from that of the first embodiment in terms of the slide position detector unit 61. The slide position detector unit 61 employed in the present embodiment indirectly detects the positions of the changeover member 7 by detecting the driving state of the shift actuator 6. In this respect, the slide position detector unit 61 of the present embodiment is the same as that of the sixth embodiment. However, the slide position detector unit 61 of the present embodiment differs from that of the sixth embodiment in the following aspects.

Figure 13A:
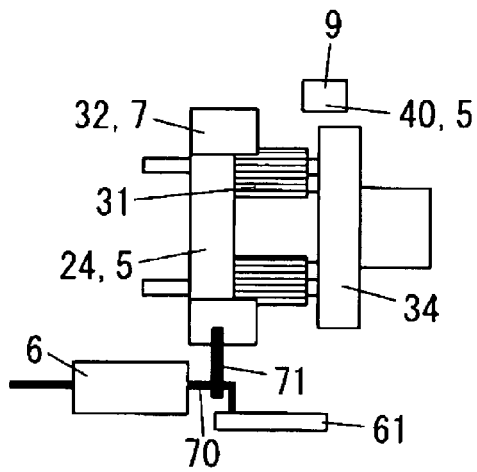
FIGS. 13A to 13C are explanatory views showing major parts of an electric power tool in accordance with a seventh embodiment of the present invention, FIG. 13A illustrating a second speed state, FIG. 13B illustrating the ongoing shift operation from a second speed to a third speed and FIG. 13C illustrating a third speed state.
Figure 13B:
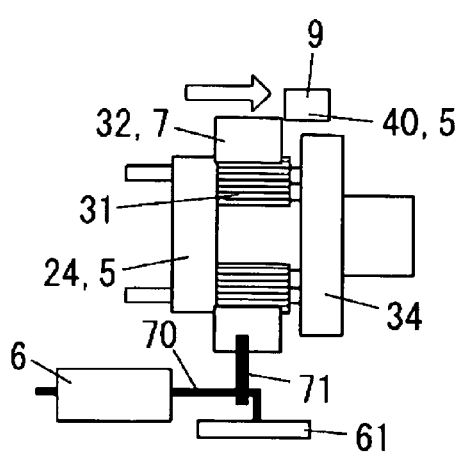
Figure 13C:
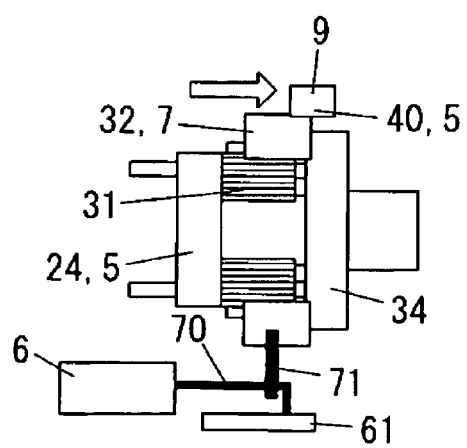

FIGS. 13A, 13B and 13C schematically show the slide position detector unit 61 employed in the present embodiment. In case of the present embodiment, the shift actuator 6 is a linear actuator formed of a solenoid. The shift actuator 6 includes a plunger 70 whose axial protrusion amount is changeable. The ring gear 32 included in the changeover member 7 is connected to the plunger 70 through a connecting member 71. The ring gear 32 is rotatable about the axis of the speed reduction mechanism 2 with respect to the connecting member 71 and is axially slidable together with the connecting member 71.

The slide position detector unit 61 is a displacement sensor for detecting the protruding position of the plunger 70 of the linear shift actuator 6. While this displacement sensor is of a contact type making direct contact with the plunger 70, a contactless sensor may be used in place thereof.

The detailed configurations of the electric power tools in accordance with the first through seventh embodiments have been described hereinabove.

As described above, each of the electric power tools of the first through seventh embodiments includes the motor 1 as a drive power source, the speed reduction mechanism 2 for transferring the rotational power of the motor 1 at a reduced speed and the reduction ratio changing unit for changing the reduction ratio of the speed reduction mechanism 2. The speed reduction mechanism 2 is designed to change the reduction ratio by using the axially slidable changeover member 7 and the gear member 5 whose engagement and disengagement with the changeover member 7 are changed depending on the axial slide positions of the changeover member 7.

The reduction ratio changing unit includes the shift actuator 6 for axially sliding the changeover member 7, the driving state detector unit 60 for detecting the driving state of the motor 1, the slide position detector unit 61 for detecting the slide positions of the changeover member 7, and the control unit 62 for starting up the shift actuator 6 depending on the detection result of the driving state detector unit 60 and for changing the drive control of the shift actuator 6 depending on the detection result of the slide position detector unit 61.

In the electric power tool having the configurations described above, when the changeover member 7 makes the slide movement to a certain degree by driving the shift actuator 6, it is possible to control the rotational power of the motor 1 to be changed depending on the actually detected slide position of the changeover member 7 to significantly reduce the relative rotational speed between the changeover member 7 and the gear member 5. For that reason, it is possible to smoothly complete the automatic change of the reduction ratio in a short time while maintaining the rotation of the motor 1. As a result, in the electric power tool of the present embodiment, it is possible to suppress the engagement shock when the reduction ratio is changed and quickly and smoothly complete the change of the reduction ratio.

Further, in the first to seventh embodiments, the control unit 62 is designed to change the drive control of the shift actuator 6 depending on the detection result of the slide position detector unit 61. In other words, depending on the actually detected slide position of the changeover member 7, the control can be carried out to change the rotational power of the motor 1 and the drive control of the shift actuator 6. Accordingly, it is possible to more smoothly complete the automatic change of the reduction ratio while maintaining the rotation of the motor 1.

Especially, in the electric power tools of the first, fifth to seventh embodiments, the control unit 62 is designed to temporarily reverse the direction of slide movement of the changeover member 7 caused by the shift actuator 6 if the detection result of the slide position detector unit 61 indicates that the changeover member 7 fails to slide to a desired target position when the shift actuator 6 is driven. Accordingly, if the changeover member 7 fails to successfully engage with the gear member 5, the changeover member 7 is temporarily spaced apart from the gear member 5. After changing the relative rotational position of the changeover member 7 and the gear member 5, an attempt can be made to cause the changeover member 7 and the gear member 5 to mesh with each other.

Further, in the electric power tool of the second embodiment, the control unit 62 is designed to change the sliding drive power of the changeover member 7 applied by the shift actuator 6 if the detection result of the slide position detector unit 61 indicates that the changeover member 7 fails to slide to the desired target position when the shift actuator 6 is driven. Accordingly, if the changeover member 7 fails to successfully engage with the gear member 5, the changeover member 7 and the gear member 5 can be made easy to mesh with each other by, e.g., increasing the drive power of the shift actuator 6.

Further, in the electric power tool of the third embodiment, if the detection result of the slide position detector unit 61 indicates that the changeover member 7 fails to slide to the desired target position when the shift actuator 6 is driven, the control unit 62 is designed to change the relative rotational position between the changeover member 7 and the gear member 5 while maintaining the driving of the shift actuator 6. Accordingly, the changeover member 7 and the gear member 5 becomes easy to mesh with each other and, furthermore, it is possible to slide the changeover member 7 by quickly dealing with the case when the changeover member 7 slide to such a position that it can easily mesh with the gear member 5. Therefore, it is possible to smoothly change the reduction ratio in a short time.

In the electric power tool of the fourth embodiment, if the detection result of the slide position detector unit 61 indicates that the changeover member 7 fails to slide to the desired target position when the shift actuator 6 is driven, the control unit 62 is designed to change the relative rotational position between the changeover member 7 and the gear member 5 after stopping the driving of the shift actuator 6. Accordingly, if the changeover member 7 fails to engage with the gear member 5, the slide movement of the changeover member 7 is stopped to easily change the relative rotational position between the changeover member 7 and the gear member 5. After the relative rotational position between the changeover member 7 and the gear member 5 is changed, an attempt can be made to cause the changeover member 7 and the gear member 5 to mesh with each other.

In the electric power tool of the third and the fourth embodiment, when changing the relative rotational position between the changeover member 7 and the gear member 5 by increasing the rotational power of the motor 1, the control unit 62 changes the rotational power of the motor 1 such that the rotational acceleration of the rotational power becomes increased in the cases that the changeover member 7 makes the slide movement compared with the case that the changeover member 7 makes no slide movement. This makes it easy to re-put the rotational power of the motor 1 the work this process and, thus, it is possible to shorten a changeover time required for changing the reduction ratio.

In the electric power tool of the first to the fifth embodiment, the slide position detector unit 61 is designed to detect a position of the changeover member 7 or a member interlocked with the changeover member 7. Accordingly, it is possible to more directly the actual slide position of the changeover member 7.

In the electric power tool of the sixth and the seventh embodiment, the slide position detector unit 61 is designed to detect the driving state of the shift actuator 6 and indirectly detect the position of the changeover member based on the detection result of the driving state. Accordingly, the degree of freedom in installation and type of a sensor of the slide position detector unit 61 is increased.

In the electric power tool of the sixth embodiment, the shift actuator 6 is of a rotary type and the slide position detector unit 61 is designed to detect the rotational state of the shift actuator 6. Accordingly, it is possible to configure the sensor of the slide position detector unit 61 to contact with or to be close to the shift actuator 6 in a compact manner.

Further, in the electric power tool of the seventh embodiment, the shift actuator 6 is a linear actuator and the slide position detector unit 61 is designed to direct the linear driving state of the shift actuator 6. This also makes it possible to configure the sensor of the slide position detector unit 61 to contact with or to be close to the shift actuator 6 in a compact manner.

While the present invention has been described above based on the embodiments shown in the accompanying drawings, the present invention is not limited to these embodiments. The respective embodiments may be properly modified in design and may be appropriately combined without departing from the scope of the invention.

Although the relative rotational position between the changeover member 7 and the gear member 5 is changed by decreasing or increasing the rotational power of the motor 1 in the electric power tool of the third and the fourth embodiment, the present invention is not limited to the adjustment of the relative rotational position by changing the rotational power of the motor 1. For example, the relative rotational position may be changed by providing a separate driving unit other than the motor 1 and controlling the driving unit to reduce the relative rotation speed between the changeover member 7 and the gear member 5. Moreover, the motor 50 as the driving unit of the shift actuator 6 may be also used to reduce the relative rotation speed between the changeover member 7 and the gear member 5.

The state where the rotational power of the motor is stopped when the shift operation fails includes the case of the operation for initializing the reduction ratio, e.g., the shift operation from the third speed to the first speed, for the next operation by stopping the motor in advance, for example, when the work using the electric power tool is finished. In other words, in case that the operation for initializing the reduction ratio is executed when the driving of the motor 1 is stopped after the work is finished, if the shift operation fails, the control unit 62 drives the motor 1 and increases its rotational power. This makes it possible to quickly initialize the reduction ratio and improve the operation efficiency of the electric power tool.

What is claimed is:

1. An electric power tool, comprising:
a motor as a drive power source;
a speed reduction mechanism for transferring a rotational power of the motor at a reduced speed; and
a reduction ratio changing unit for changing a reduction ratio of the speed reduction mechanism,
wherein the speed reduction mechanism includes an axially slidable changeover member and a gear member, the changeover member being engaged with or disengaged from the gear member depending on an axial slide position thereof,
wherein the reduction ratio changing unit includes a shift actuator for axially sliding the changeover member, a driving state detector unit for detecting a driving state of the motor, a slide position detector unit which detects a physical slide position of the changeover member and a control unit for starting up the shift actuator depending on a detection result of the driving state detector unit and for temporarily decreasing or increasing a rotational power of the motor depending on a detection result of the slide position detector unit,
wherein the changeover member is allowed to slide to a target position when the changeover member is engaged with the gear member, and
wherein the control unit changes at least one of a drive control of the motor and a drive control of the shift actuator when the detection result of the slide position detector unit indicates that the changeover member fails to slide to the target position when the shift actuator is driven.

2. The electric power tool of claim 1, wherein the control unit changes the drive control of the shift actuator depending on the detection result of the slide position detector unit.

3. The electric power tool of claim 2, wherein the control unit temporarily reverses the direction of slide movement of the changeover member caused by the shift actuator when the detection result of the slide position detector unit indicates that the changeover member fails to slide to the target position when the shift actuator is driven.

4. The electric power tool of claim 2, wherein the control unit changes the sliding drive power of the changeover member applied by the shift actuator when the detection result of the slide position detector unit indicates that the changeover member fails to slide to the target position when the shift actuator is driven.

5. The electric power tool of claim 2, wherein, if the detection result of the slide position detector unit indicates that the changeover member fails to slide to the target position when the shift actuator is driven, the control unit changes a relative rotational position between the changeover member and the gear member while keeping the driving of the shift actuator.

6. The electric power tool of claim 2, wherein, if the detection result of the slide position detector unit indicates that the changeover member fails to slide to the target position when the shift actuator is driven, the control unit changes a relative rotational position between the changeover member and the gear member after stopping the driving of the shift actuator.

7. The electric power tool of claim 5, wherein the control unit changes the relative rotational position by increasing the rotational power when it is determined by the detection result of the driving state detector unit that the rotational power of the motor is decreased or stopped.

8. The electric power tool of claim 7, wherein the control unit changes the rotational power of the motor such that a rotational acceleration of the motor provided while the changeover member makes slide movement is greater than a rotational acceleration of the motor provided while the changeover member makes no slide movement.

9. The electric power tool of claim 6, wherein the control unit changes the relative rotational position by increasing the rotational power when it is determined by the detection result of the driving state detector unit that the rotational power of the motor is decreased or stopped.

10. The electric power tool of claim 9, wherein the control unit changes the rotational power of the motor such that a rotational acceleration of the motor provided while the changeover member makes slide movement is greater than a rotational acceleration of the motor provided while the changeover member makes no slide movement.

11. The electric power tool of claim 1, wherein the slide position detector unit detects a position of the changeover member or a member interlocked with the changeover member.

12. The electric power tool of claim 1, wherein the slide position detector unit detects a driving state of the shift actuator and detect a position of the changeover member based on the detection result of the driving state of the shift actuator.

13. The electric power tool of claim 12, wherein the shift actuator is of a rotary type, and the slide position detector unit detects a rotational state of the shift actuator.

14. The electric power tool of claim 12, wherein the shift actuator is a linear actuator, and the slide position detector unit detects a linear driving state of the shift actuator.

* * * * *